United States Patent
Buys et al.

(10) Patent No.: US 11,747,478 B2
(45) Date of Patent: Sep. 5, 2023

(54) STAGE MAPPING AND DETECTION USING INFRARED LIGHT

(71) Applicant: Electronic Theatre Controls, Inc., Middleton, WI (US)

(72) Inventors: Koen Buys, Hofstade (BE); Dennis Varian, Middleton, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 335 days.

(21) Appl. No.: 16/874,897

(22) Filed: May 15, 2020

(65) Prior Publication Data

US 2020/0363531 A1 Nov. 19, 2020

Related U.S. Application Data

(60) Provisional application No. 62/848,125, filed on May 15, 2019.

(51) Int. Cl.
*H05B 47/13* (2020.01)
*G01S 7/481* (2006.01)
(Continued)

(52) U.S. Cl.
CPC ............ *G01S 17/89* (2013.01); *G01S 7/4817* (2013.01); *G01S 17/894* (2020.01); *H05B 47/13* (2020.01)

(58) Field of Classification Search
CPC ...... G01S 17/89; G01S 7/4817; G01S 17/894; H05B 47/13; H05B 47/125; H05B 47/17; Y02B 20/40; G01B 11/245; G01B 11/25
See application file for complete search history.

(56) References Cited

U.S. PATENT DOCUMENTS

2010/0309288 A1\* 12/2010 Stettner ................ H04N 5/33
  348/E13.001
2012/0033069 A1\* 2/2012 Becker ................ G01S 17/42
  345/592

(Continued)

FOREIGN PATENT DOCUMENTS

WO WO-2018173311 A1 \* 9/2018 ............. G01B 11/25

OTHER PUBLICATIONS

Smedley-Warren, Greg, et al. "Classroom Lighting." The Kindergarten Smorgasboard, Jun. 4, 2021, https://thekindergartensmorgasboard.com/2017/08/classroom-lighting.html. (Year: 2017).\*

*Primary Examiner* — Renan Luque
(74) *Attorney, Agent, or Firm* — Michael Best & Friedrich LLP

(57) ABSTRACT

A system for mapping a stage includes a lighting fixture, a scanner, and a controller. The lighting fixture includes a visible light source and an infrared light source. The lighting fixture at least partially illuminates the stage with structured infrared light. The scanner detects the structured infrared light on the stage. The controller is connected to the lighting fixture and the scanner. The controller turns on the visible light source in a visible light mode and turns on the infrared light source in an infrared light mode. The infrared light source illuminates at least a portion of the stage with the structured infrared light. The controller also directs the scanner to scan the structured infrared light on the portion of the stage, receives signals from the scanner as scan data, and translates the scan data into three-dimensional location data.

12 Claims, 16 Drawing Sheets

(51) Int. Cl.
*G01S 17/894* (2020.01)
*G01S 17/89* (2020.01)

(56) References Cited

U.S. PATENT DOCUMENTS

| | | | | |
|---|---|---|---|---|
| 2012/0194650 | A1* | 8/2012 | Izadi | H04N 5/332 |
| | | | | 348/47 |
| 2016/0006914 | A1* | 1/2016 | Neumann | H04N 23/74 |
| | | | | 348/370 |
| 2017/0277028 | A1* | 9/2017 | Short | G01B 11/2513 |
| 2018/0176521 | A1* | 6/2018 | Laduke | H05B 45/20 |
| 2018/0196998 | A1* | 7/2018 | Price | G06V 40/172 |
| 2018/0224551 | A1* | 8/2018 | Kiy | H05B 47/125 |
| 2019/0302472 | A1* | 10/2019 | Chapman | G02B 27/646 |
| 2019/0364251 | A1* | 11/2019 | Tsubota | G03B 21/2073 |

* cited by examiner

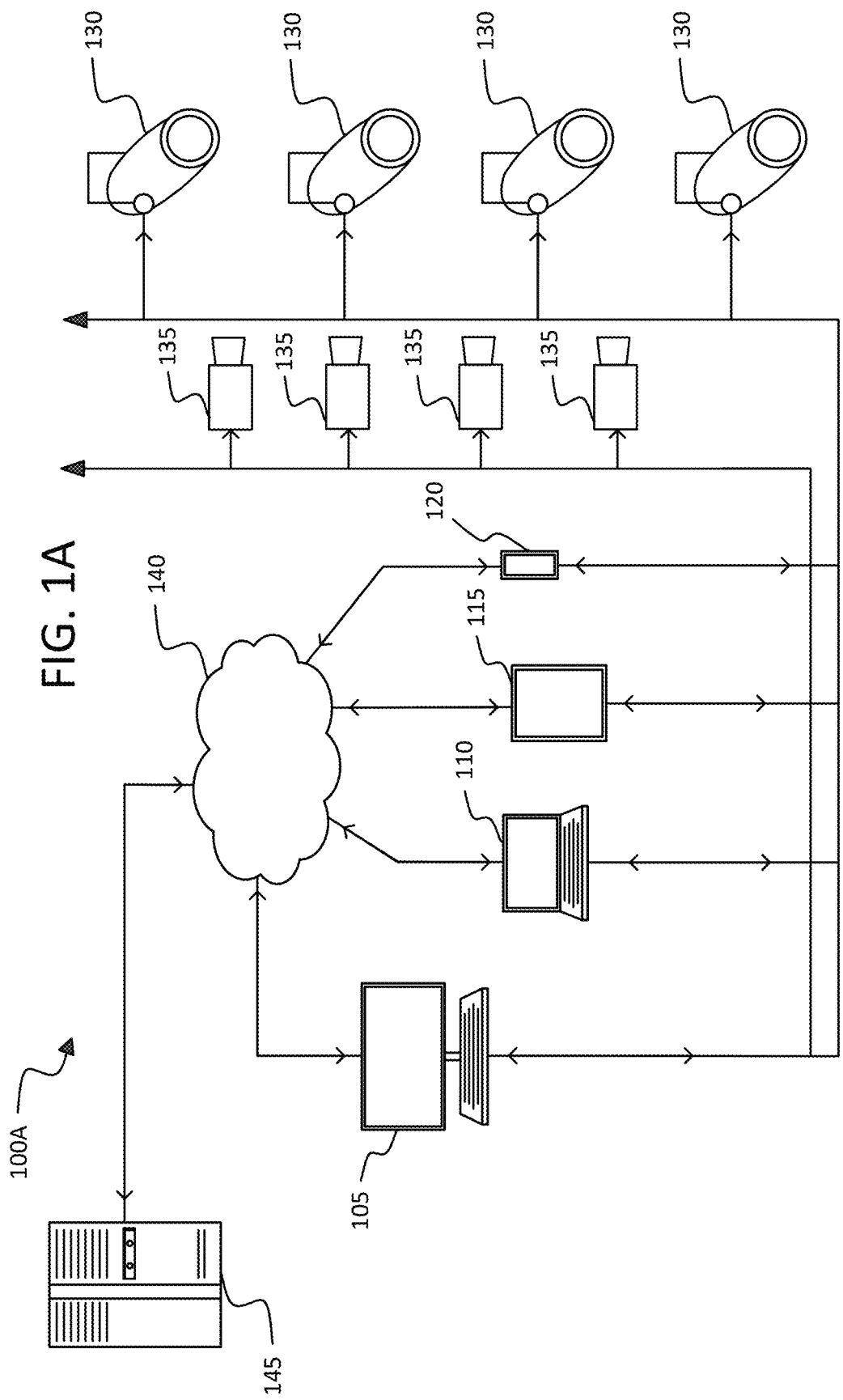

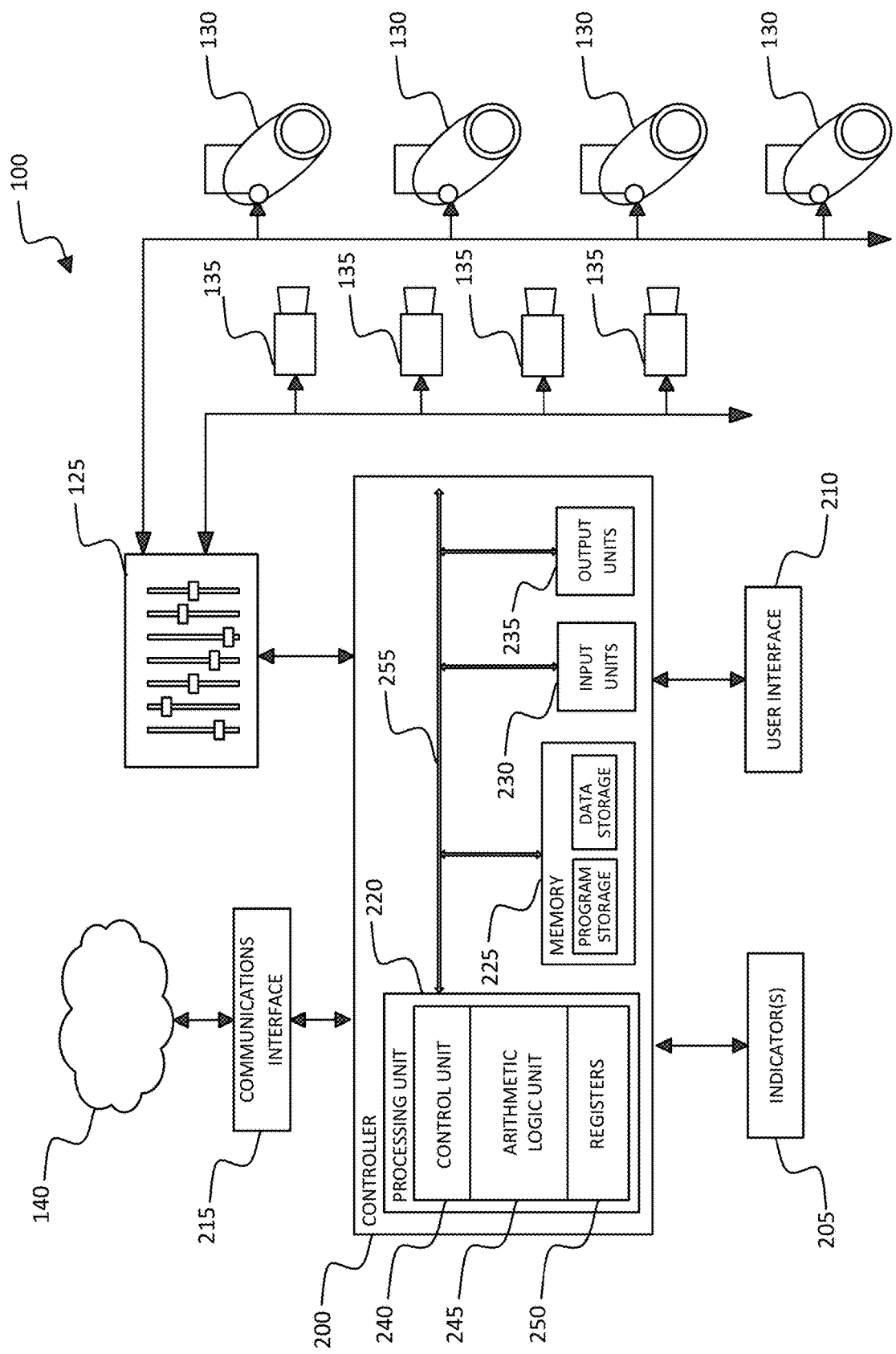

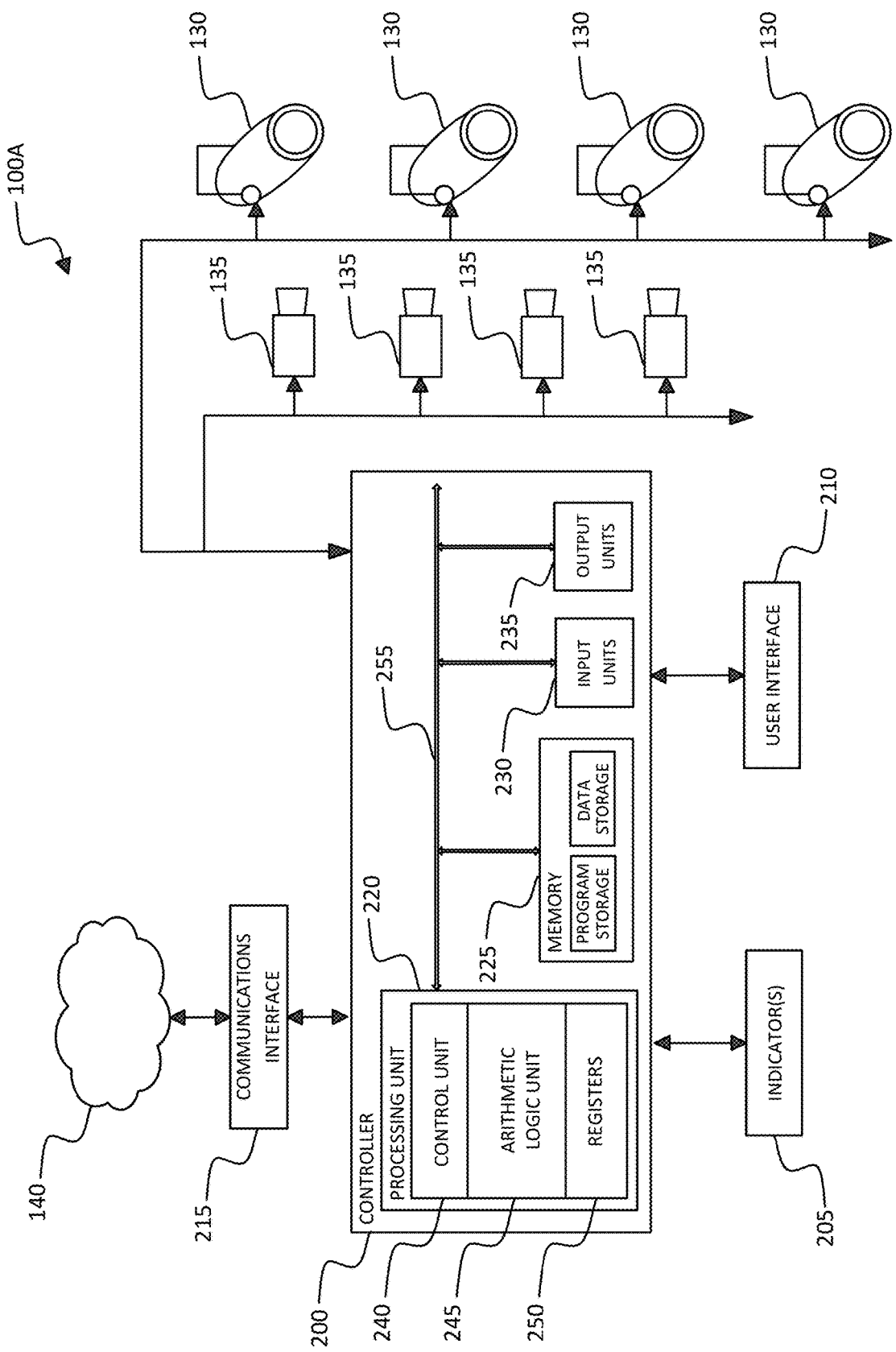

STAGE MAPPING AND DETECTION USING INFRARED LIGHT

RELATED APPLICATIONS

This application claims the benefit of U.S. Provisional Patent Application No. 62/848,125, filed May 15, 2019, the entire content of which is hereby incorporated by reference.

FIELD

Embodiments described herein relate to object detection.

SUMMARY

It would be beneficial to be able to map a stage in three dimensions. Information gathered from mapping the stage can be used to create a three-dimensional ("3D") model of the stage in a digital form. Such digital 3D models could be used in interactive digital environments.

Currently, a user must physically measure the dimensions of a stage with manual tools, such as a measuring tape, in order to accurately gather dimension data of the stage. The user must then keep this dimension data written down or memorized in order to use it for determining lighting arrangements and the like. The dimension data is difficult to visualize when not viewing the stage itself, and creating a representation of the stage, digital or otherwise, would be prohibitively time consuming due to the number of measurements that must be made and recorded by hand. To make the use of such an interactive three-dimensional environment practical, however, the dimension data must be gathered more quickly and easily than what can be done by hand.

However, detecting or tracking one or more objects on a stage, such as scenery elements and performers, is also difficult due to the various lighting conditions during a performance. Fully dark scenes prevent visible light cameras from detecting the objects due to a lack of visible input. Very bright or light-saturated scenes can similarly prevent visible light cameras from detecting the objects due to ambient light interference.

Therefore, the dimension data gathering must be effective regardless of lighting conditions in order to capture the stage and objects during, for instance, a performance.

Accordingly, to address these and other technical problems, embodiments described herein provide, among other things, a system and a method for mapping a stage and detecting objects to quickly gather multiple data points. The system and method gather multiple data points in a fraction of the time it would take one or more individuals to measure the stage by hand. These data points could then be imported into specialized 3D modeling software in the form of an interactive three-dimensional stage model. This model may then be used to control one or more lights. In some embodiments, the system and method gather these data points regardless of lighting conditions, which allows a user to access real-time or nearly real-time data during a live performance. For example, a user may control one or more lights associated with the stage in an intuitive and accurate manner during a performance. Also, tracking and/or detecting objects on the stage during a performance would allow a user to control one or more lights through the interactive three-dimensional environment while taking into account the objects on the stage.

Systems described herein for mapping a stage include a lighting fixture, a scanner, and a controller. The lighting fixture includes a visible light source and an infrared light source. The lighting fixture at least partially illuminates the stage with structured infrared light. The scanner detects the structured infrared light on the stage. The controller is connected to the lighting fixture and the scanner. The controller turns on the visible light source in a visible light mode and turns on the infrared light source in an infrared light mode. The infrared light source illuminates at least a portion of the stage with the structured infrared light. The controller also controls the scanner to scan the structured infrared light on the portion of the stage, receives a signal from the scanner as scan data, and translates the scan data into three-dimensional location data.

Systems described herein for mapping a stage include a first lighting fixture, a second lighting fixture, a scanner, and a controller. The first lighting fixture includes an infrared light source. The first lighting fixture at least partially illuminates the stage with structured infrared light. The second lighting fixture includes a visible light source. The scanner detects the structured infrared light on the stage. The controller is connected to the first lighting fixture, the second lighting fixture, and the scanner. The controller turns on the infrared light source of the first lighting fixture. The infrared light source illuminates at least a portion of the stage with the structured infrared light. The controller also directs the scanner to scan the structured infrared light on the portion of the stage, receives a signal from the scanner as scan data, translates the scan data into three-dimensional location data, receives a user input based on the three-dimensional location data, and adjusts a lighting setting of the second lighting fixture based on the user input.

Methods described herein for mapping a stage include operating a lighting fixture in a visible light mode, focusing the lighting fixture, switching the lighting fixture to an infrared light mode, illuminating at least a portion of the stage with structured infrared light from the lighting fixture in the infrared light mode, scanning the structured infrared light on the stage, translating scan data into three-dimensional location data, and displaying the three-dimensional location data as an interactive three-dimensional environment.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

BRIEF DESCRIPTION OF THE DRAWINGS

FIG. 1A schematically illustrates an alternative system for mapping a stage in three dimensions, detecting objects, and controlling at least one lighting fixture.

FIG. 2 illustrates a controller for the system of FIG. 1.

FIG. 2A illustrates a controller for the system of FIG. 1A.

DETAILED DESCRIPTION

Embodiments described herein relate to mapping a stage in three dimensions to locate stage surfaces and objects and create an interactive three-dimensional ("3D") environment. Some embodiments further relate to mapping a stage in three dimensions to create an interactive three-dimensional environment for testing and controlling lighting visuals. The 3D environment allows a user to control one or more lights associated with the stage in an intuitive and accurate manner.

Figure 1:
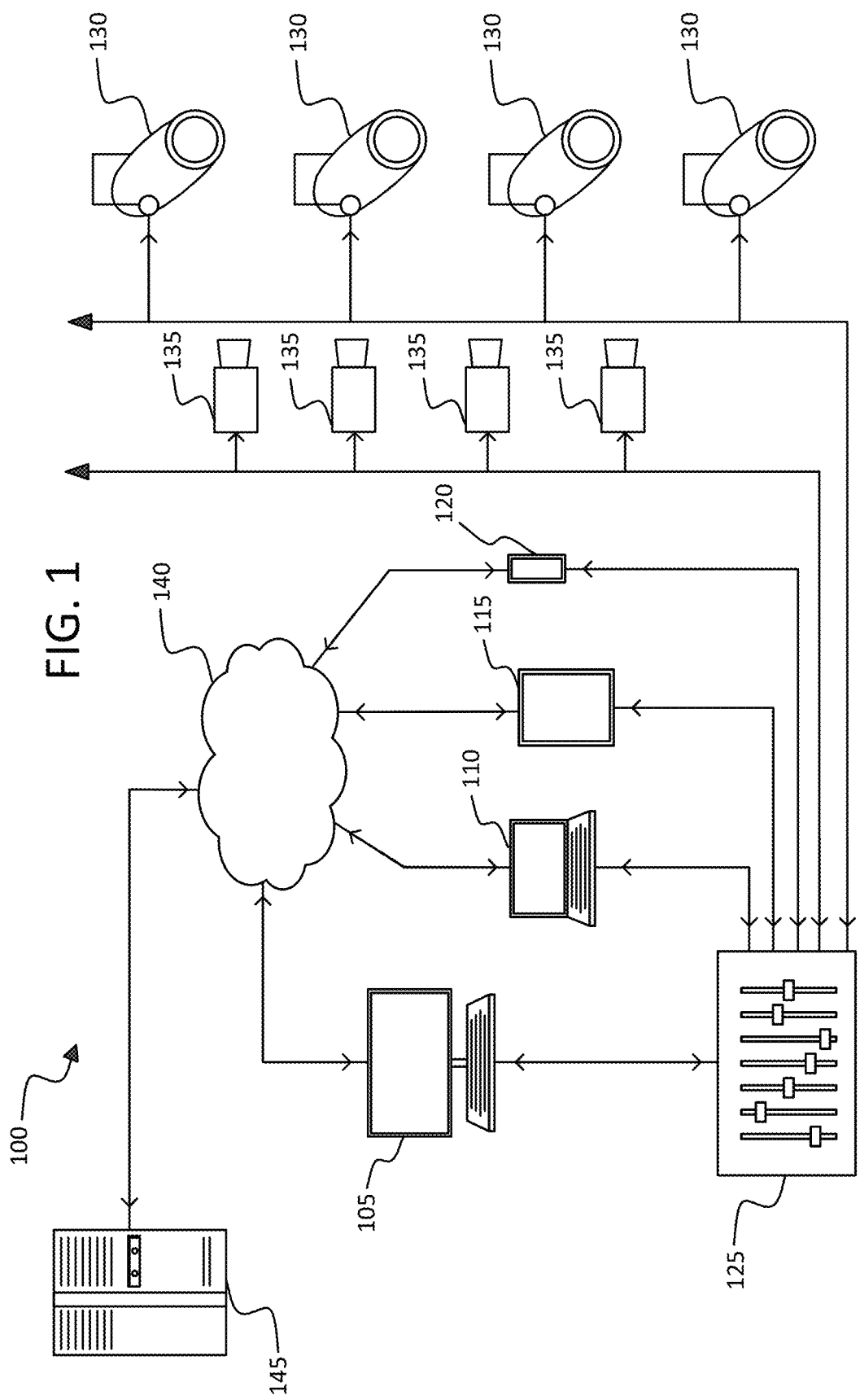
FIG. 1 schematically illustrates a system for mapping a stage in three dimensions, detecting objects, and controlling at least one lighting fixture.

FIG. 1 illustrates a system 100 for gathering dimension data of a stage, including any objects that may be present on the stage such as performers or stage scenery elements, and controlling lighting fixtures according to the dimension data. The system 100 is provided as an example and, in some embodiments, the system 100 includes additional components. The illustrated system 100 includes a user input device 105-120, a control board or control panel 125, at least one lighting fixture 130, at least one camera 135, a communications network 140, and a server-side mainframe computer or server 145. The user input device 105-120 includes, for example, a personal or desktop computer 105, a laptop computer 110, a tablet computer 115, or a mobile phone (e.g., a smart phone) 120. Other user input devices may include, for example, an augmented reality headset or glasses. The camera 135 may be integrated with the user input device 105-120, such as the camera of the mobile phone 120, or the camera 135 may be entirely separate from the user input device 105-120.

The user input device 105-120 is configured to communicatively connect to the server 145 through the network 140 and provide information to, or receive information from, the server 145 related to the control or operation of the system 100. The user input device 105-120 is also configured to communicatively connect to the control board 125 to provide information to, or receive information from, the control board 125. The connections between the user input device 105-120 and the control board 125 or network 140 are, for example, wired connections, wireless connections, or a combination of wireless and wired connections. Similarly, the connections between the server 145 and the network 140, the control board 125 and the lighting fixtures 130, or the control board 125 and the camera 135 are wired connections, wireless connections, or a combination of wireless and wired connections.

The network 140 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 140 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio, a Digital Enhanced Cordless Telecommunications ("DECT") network, a Digital AMPS ("IS-136/TDMA") network, or an Integrated Digital Enhanced Network ("iDEN") network, etc.

FIG. 1A illustrates an alternative system 100A for gathering dimension data of a stage, including any objects that may be present on the stage such as performers or stage scenery elements, and controlling lighting fixtures according to the dimension data. The hardware of the alternative system 100A is identical to the above system 100 in every way, except the control board or control panel 125 is omitted. As such, the user input device 105-120 is configured to communicatively connect to the lighting fixtures 130 and to the camera 135. The connections between the user input device 105-120 and the lighting fixtures 130 and the connections between the user input device 105-120 and the camera 135 are wired connections, wireless connections, or a combination of wireless and wired connections.

FIG. 2 illustrates a controller 200 for the system 100. The controller 200 is electrically and/or communicatively connected to a variety of modules or components of the system 100. For example, the illustrated controller 200 is connected to one or more indicators 205 (e.g., LEDs, a liquid crystal display ["LCD"], etc.), a user input or user interface 210

(e.g., a user interface of the user input device 105-120 in FIG. 1), and a communications interface 215. The controller 200 is also connected to the control board 125. The communications interface 215 is connected to the network 140 to enable the controller 200 to communicate with the server 145. The controller 200 includes combinations of hardware and software that are operable to, among other things, control the operation of the system 100, control the operation of the lighting fixture 130, control the operation of the camera 135, receive one or more signals from the camera 135, communicate over the network 140, communicate with the control board 125, receive input from a user via the user interface 210, provide information to a user via the indicators 205, etc. In some embodiments, the indicator 205 and the user interface 210 may be integrated together in the form of, for instance, a touch-screen.

In the embodiment illustrated in FIG. 2, the controller 200 would be associated with the user input device 105-120. As a result, the controller 200 is illustrated in FIG. 2 as being connected to the control board 125 which is, in turn, connected to the lighting fixture 130 and the camera 135. In other embodiments, the controller 200 is included within the control board 125, and, for example, the controller 200 can provide control signals directly to the lighting fixture 130 and the camera 135. In other embodiments, the controller 200 is associated with the server 145 and communicates through the network 140 to provide control signals to the control board 125, the lighting fixture 130, and the camera 135.

The controller 200 includes a plurality of electrical and electronic components that provide power, operational control, and protection to the components and modules within the controller 200 and/or the system 100. For example, the controller 200 includes, among other things, a processing unit 220 (e.g., a microprocessor, a microcontroller, or another suitable programmable device), a memory 225, input units 230, and output units 235. The processing unit 220 includes, among other things, a control unit 240, an arithmetic logic unit ("ALU") 245, and a plurality of registers 250 (shown as a group of registers in FIG. 2), and is implemented using a known computer architecture (e.g., a modified Harvard architecture, a von Neumann architecture, etc.). The processing unit 220, the memory 225, the input units 230, and the output units 235, as well as the various modules or circuits connected to the controller 200 are connected by one or more control and/or data buses (e.g., common bus 255). The control and/or data buses are shown generally in FIG. 2 for illustrative purposes. The use of one or more control and/or data buses for the interconnection between and communication among the various modules, circuits, and components would be known to a person skilled in the art in view of the invention described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 220 is connected to the memory 225 and executes software instructions that are capable of being stored in a RAM of the memory 225 (e.g., during execution), a ROM of the memory 225 (e.g., on a generally permanent basis), or another non-transitory computer readable medium such as another memory or a disc. Software included in the implementation of the system 100 and controller 200 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

The user interface 210 is included to provide user control of the system 100, the lighting fixture 130, and/or the camera 135. The user interface 210 is operably coupled to the controller 200 to control, for example, drive signals provided to the lighting fixture 130 and/or drive signals provided to the camera 135. The user interface 210 can include any combination of digital and analog input devices required to achieve a desired level of control for the system 100. For example, the user interface 210 can include a computer having a display and input devices, a touch-screen display, a plurality of knobs, dials, switches, buttons, faders, or the like. In the embodiment illustrated in FIG. 2, the user interface 210 is separate from the control board 125. In other embodiments, the user interface 210 is included in the control board 125.

The controller 200 is configured to work in combination with the control board 125 to provide direct drive signals to the lighting fixtures 130 and/or the cameras 135. As described above, in some embodiments, the controller 200 is configured to provide direct drive signals to the lighting fixtures 130 and/or the cameras 135 without separately interacting with the control board 125 (e.g., the control board 125 includes the controller 200). The direct drive signals that are provided to the lighting fixtures 130 and/or the cameras 135 are provided, for example, based on a user input received by the controller 200 from the user interface 210. The controller 200 is also configured to receive one or more signals from the camera(s) 135 related to scan data.

As shown in FIG. 2A and described above, the system 100A includes the controller 200 configured to work without the control board 125, such that the controller 200 is configured to provide signals to the lighting fixtures 130 and/or the cameras 135 and to receive one or more signals from the camera(s) 135 related to scan data.

Figure 3:
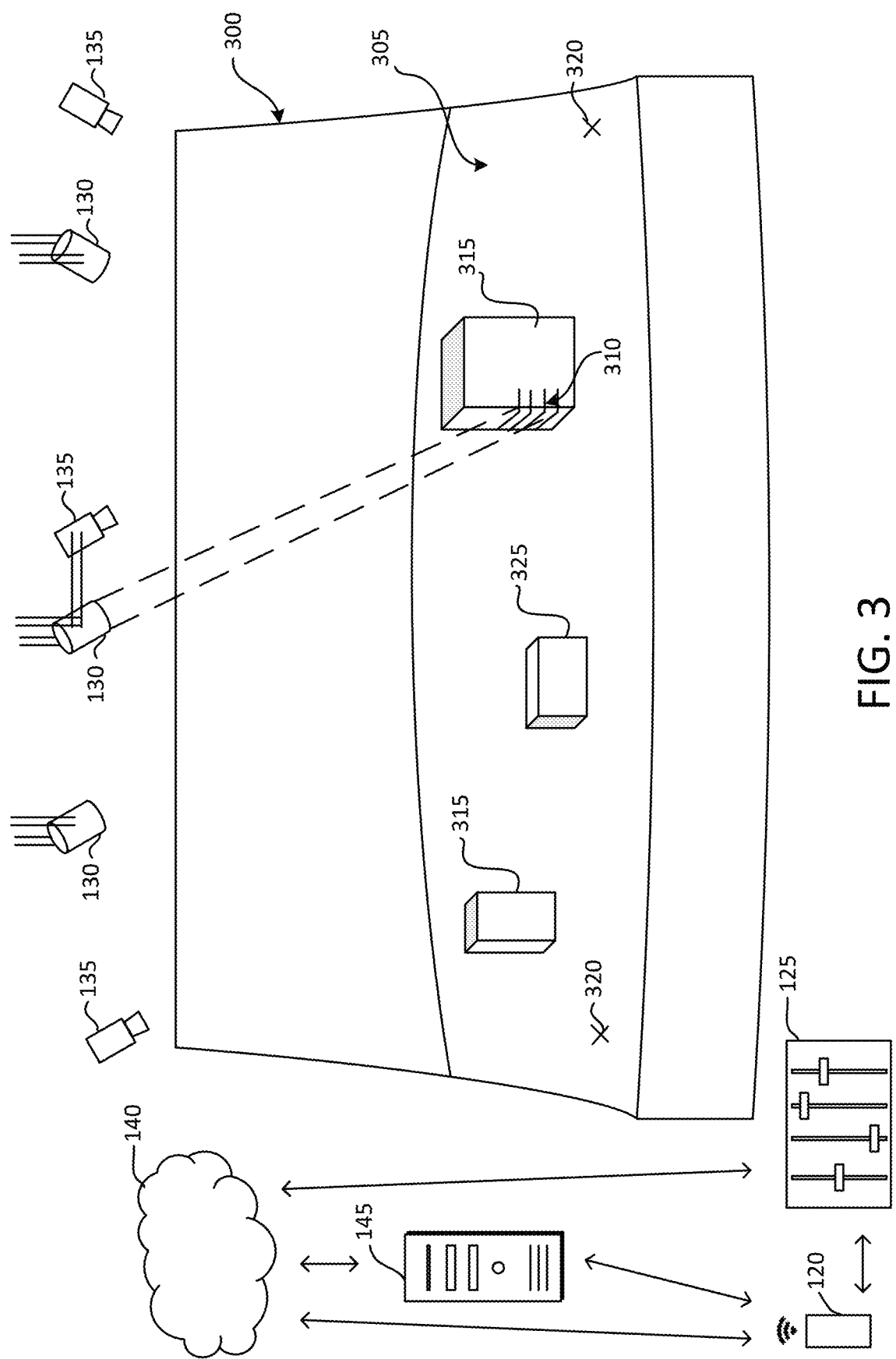
FIG. 3 illustrates cameras and lighting fixtures of the system of FIG. 1 in a venue.

FIG. 3 illustrates the control board 125, the lighting fixtures 130, the cameras 135, and the user input device 120 of the system 100 in a venue 300 including a stage 305. At least one of the lighting fixtures 130 is configured to project structured infrared light 310 onto the stage 305 and/or an object 315, as described in more detail below. In this embodiment, the system 100 further utilizes reference points 320 and a reference object 325 for calibration purposes.

Figure 3A:
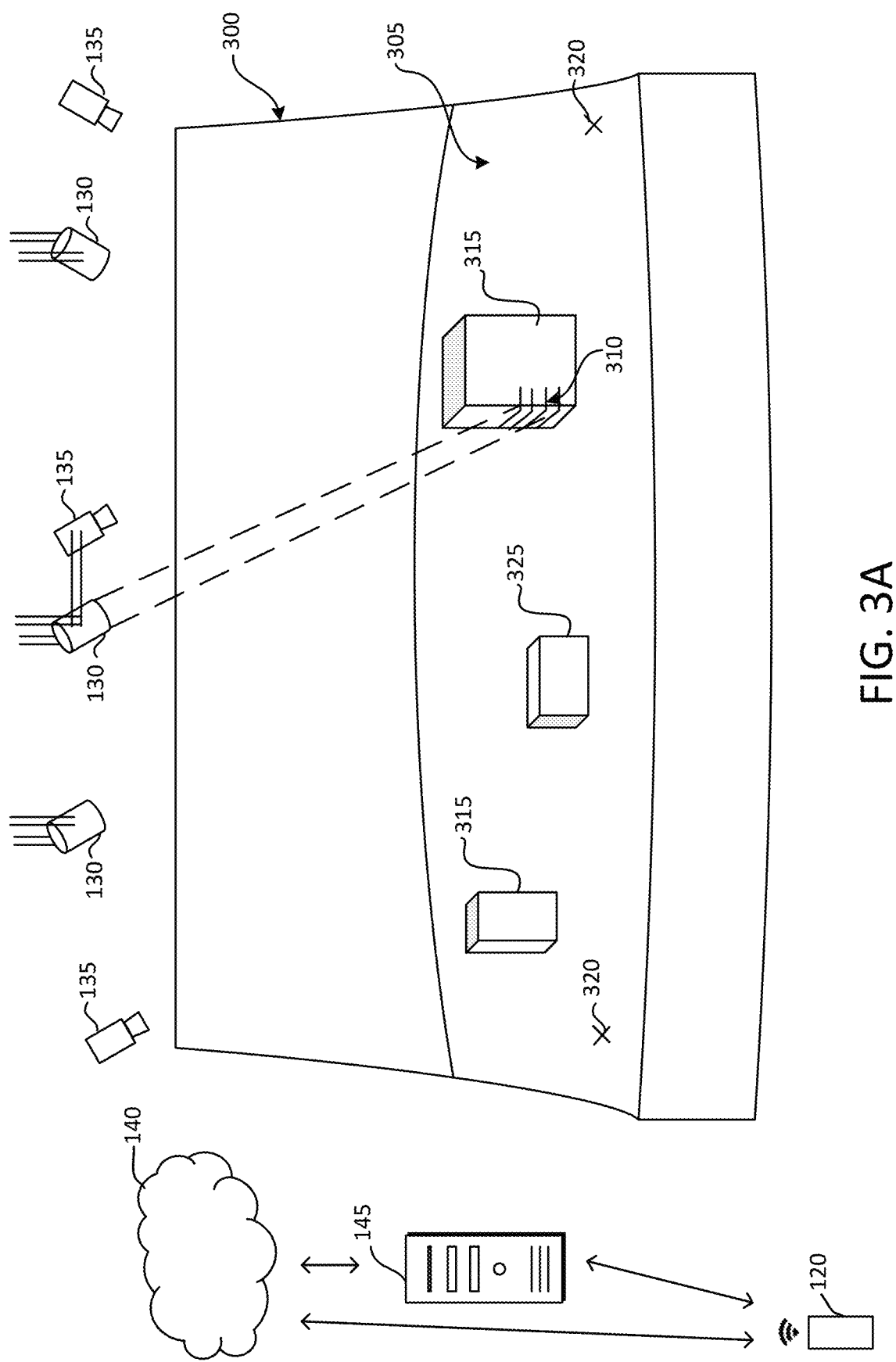
FIG. 3A illustrates cameras and lighting fixtures of the system of FIG. 1A in a venue.

FIG. 3A illustrates the system 100A in a venue 300 including a stage 305. As discussed above, the system 100A omits the control board 125, and the user input device 120 is configured to directly communicate with the lighting fixtures 130 and the camera 135.

The controller 200 receives signals from the cameras 135. The controller 200 also processes the signals and interprets the same as input data related to the dimensions and location of the stage 305. The controller 200 outputs a display of the stage 305 representing the dimension and location data to, for instance, the indicators 205. The controller 200 receives user input regarding user selected lighting visuals and lighting settings to be used via, for instance, the user interface 210. The indicators 205 further display the stage in an interactive three-dimensional environment as being altered aesthetically by the selected lighting visuals/lighting settings. The controller 200 outputs a command signal based on the entered lighting preferences. The controller 200 also controls the lighting fixtures 130 according to the command signal either directly or through the control panel 125.

The cameras 135 may include any type of scanner, include any number of scanners, and include any arrangement of scanners relative to each other. In some embodiments, the cameras 135 are configured to detect infrared light. The cameras 135 are rigidly connected to and configured to move with respective lighting fixtures 130, or are separate from the lighting fixtures 130. Examples of the cameras 135 include, for instance, a single camera mounted in a known location with a known controllable orientation, stereo cameras mounted to detect an overlapping area, or the like. In some embodiments, a single camera 135 mounted in a known location with a known controllable orientation is rigidly connected to one of the lighting fixtures 130 by members of a known length such that controlled movement of the lighting fixture 130 results in controlled movement of the camera 135. Geometric calculations can then be used to determine the location and orientation of the camera 135 at any given time based on the control input sent to the corresponding lighting fixture 130. In other embodiments, stand-alone cameras 135 are used and controlled in a manner similar to motorized lighting fixtures 130.

The controller 200 processes the dimension and location data obtained by the cameras 135 using, for instance, the processing unit 220. This processing of the characteristics of the structured infrared light 310 into dimension and location data is accomplished using an algorithm including, for instance, a band-pass filter that passes light frequencies in the infrared part of the electromagnetic spectrum and blocks light frequencies in the visible part of the electromagnetic spectrum, light intensity gradient analysis, comparison of scan data between multiple cameras 135, comparison of scan data from a single camera 135 at different positions, or the like. Some embodiments include use of a physical band-pass filter instead of a digital band-pass filter. In such embodiments, an example of a suitable physical band-pass filter is the Lee Polyester 87 Infrared band-pass filter. Once processed, each surface of the stage 305 is digitally rendered or digitized as part of one or more three-dimensional bodies. This digitization is accomplished by an algorithm for analyzing and interpreting the dimension and location data.

Additional sensors or markers can be used to augment the data that is recorded with the cameras 135 to improve accuracy. For instance, the reference points 320 are indicated with a marker to be detected by the cameras 135. In some embodiments, the marker for each of the reference points 320 is an infrared light source, a reflector for reflecting infrared light at an increased brightness relative to the surroundings, or the like. These reference points 320 can establish relative locations of the features of the stage 305 and can be helpful in calibration of the lighting fixtures 130 and/or cameras 135. A reference object 325 is also placed on the stage 305 in some embodiments. The reference object 325 has known dimensions and can be illuminated by the lighting fixtures 130 and scanned by the cameras 135 to calibrate a dimension discovery application (stored within the memory, for instance). This calibration is accomplished by a user inputting the known dimensions of the reference object 325 or commanding the system 100, 100A to operate in a calibration mode, which is preprogrammed to designate an object to be scanned in a particular location as the reference object 325. Once the reference object 325 has been scanned, the dimension discovery application can reset to designate the scan data of the reference object 325 as corresponding to the known dimension measurement values of the reference object 325.

Figure 4:
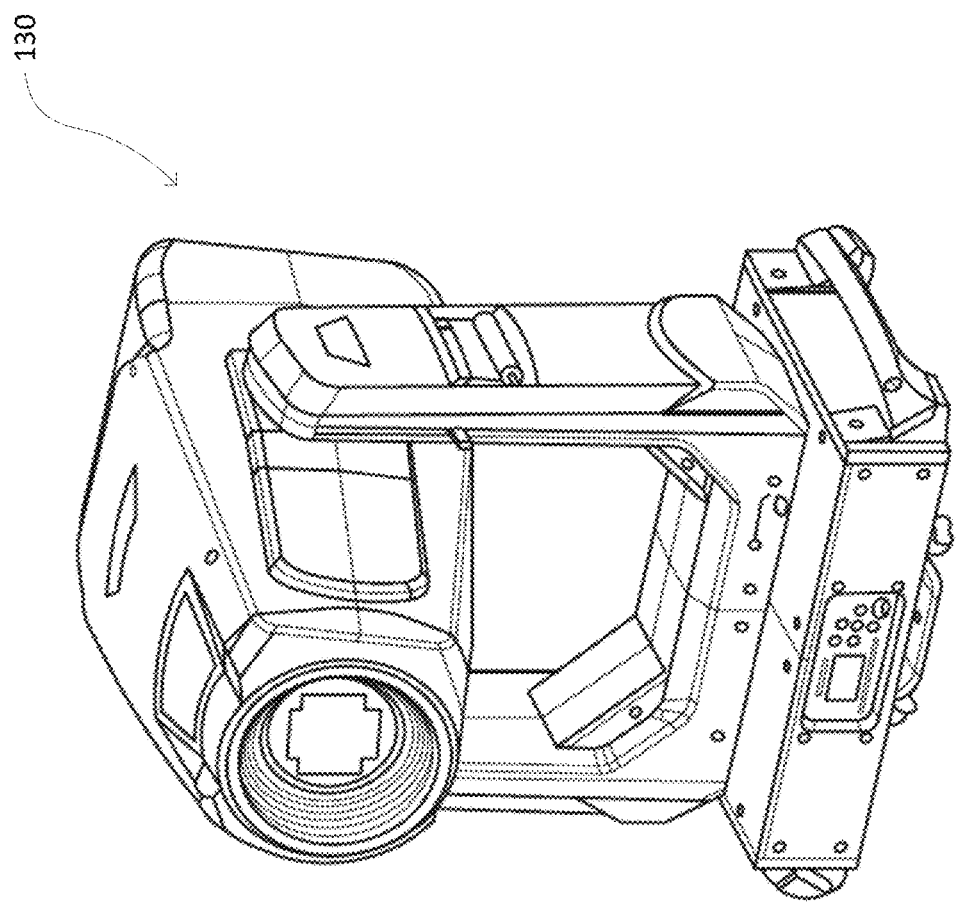
FIG. 4 illustrates a lighting fixture for use in the system of FIG. 1 or the system of FIG. 1A.

As shown in FIGS. 3 and 3A, one or more lighting fixtures 130 are used as part of the system 100, 100A. In some embodiments, the lighting fixtures 130 are existing lighting fixtures 130 already installed at the venue 300. In such embodiments, the system 100, 100A may not require additional new moving lighting fixtures 130 beyond what is already present about the stage 305. The lighting fixtures 130 are movable to cast the structured infrared light 310 on various portions of the stage 305 and/or objects 315 on the stage 305. The lighting fixtures 130 may move through a plurality of discrete positions, or they may move through a continuous movement path. In some embodiments, the lighting fixtures 130 are movable by one or more motors associated with the lighting fixtures 130, such as the type of lighting fixture 130 shown in FIG. 4. The lighting fixtures 130 project either static or dynamic structured infrared light 310. In some embodiments, only a single edge of the projected light is used as the structured infrared light 310. These embodiments reduce complexity and increase repeatability of the system 100, 100A.

Figure 5:
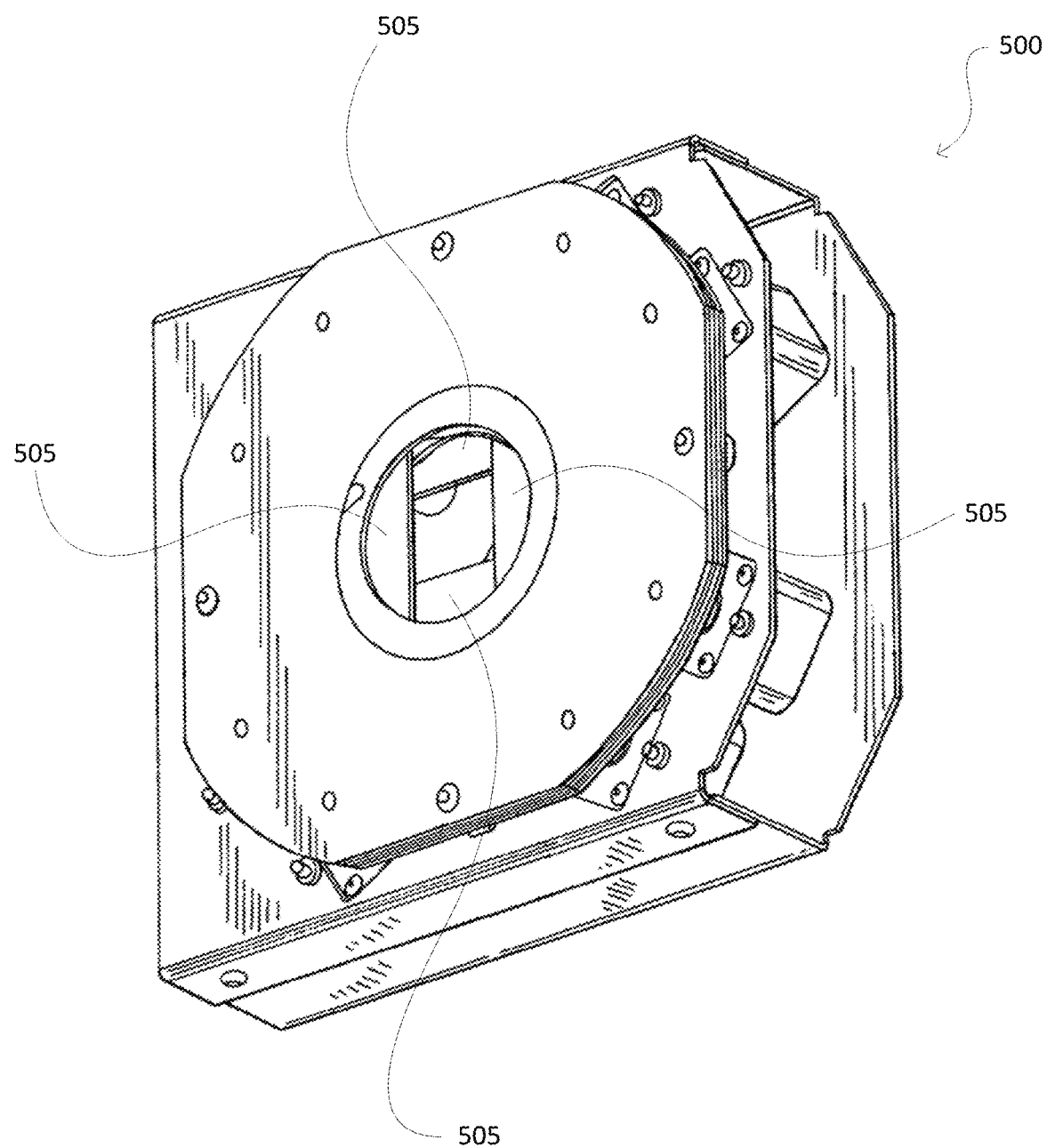
FIG. 5 illustrates a framing shutter assembly of the lighting fixture of FIG. 4.

The lighting fixtures 130 are further configured, in some embodiments, to project a plane of light such that a line of structured infrared light 310 appears on the stage 305 and/or the objects 315 on the stage 305. In some embodiments, this plane of light is formed through a shutter assembly 500, shown in FIG. 5, located within the lighting fixture 130 and controlling the position of framing shutters 505. In such embodiments, the structured infrared light 310 may advantageously be rotated to create a dynamic structured infrared light 310 to improve the scan accuracy.

Figure 6:
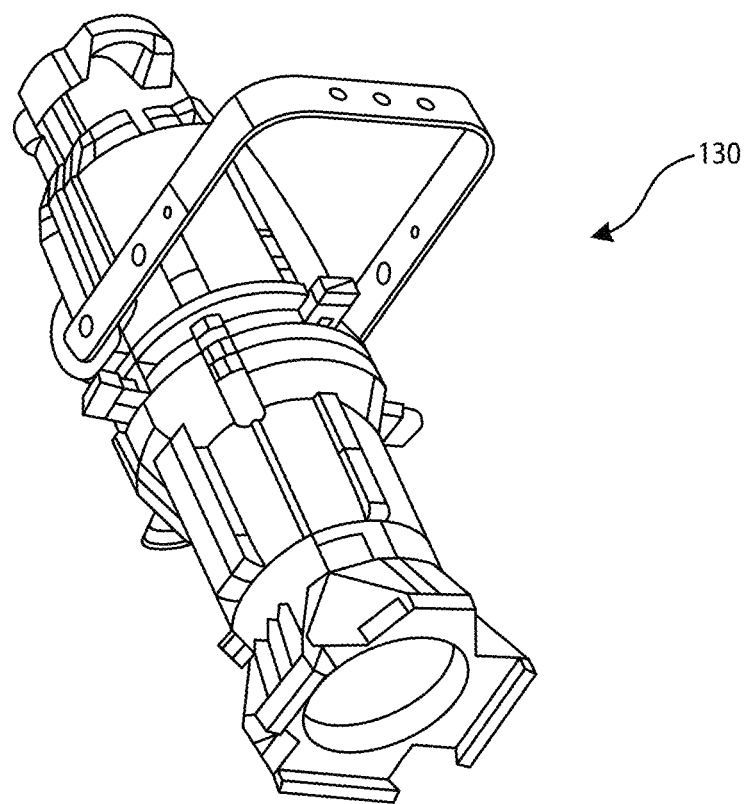
FIG. 6 illustrates an alternative lighting fixture for use in the system of FIG. 1 or the system of FIG. 1A.
Figure 7:
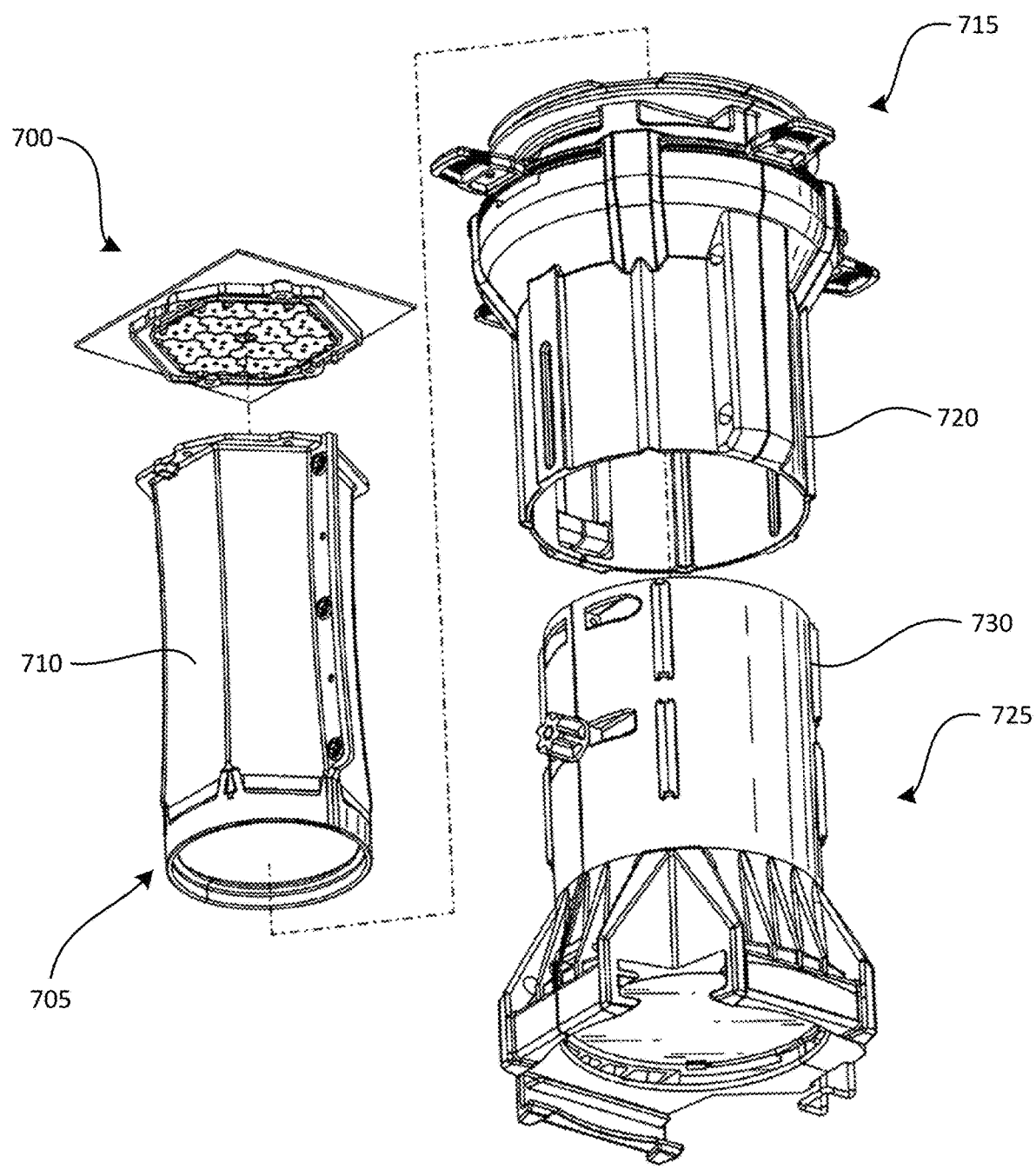
FIG. 7 illustrates an exploded view of the lighting fixture of FIG. 6.
Figure 8:
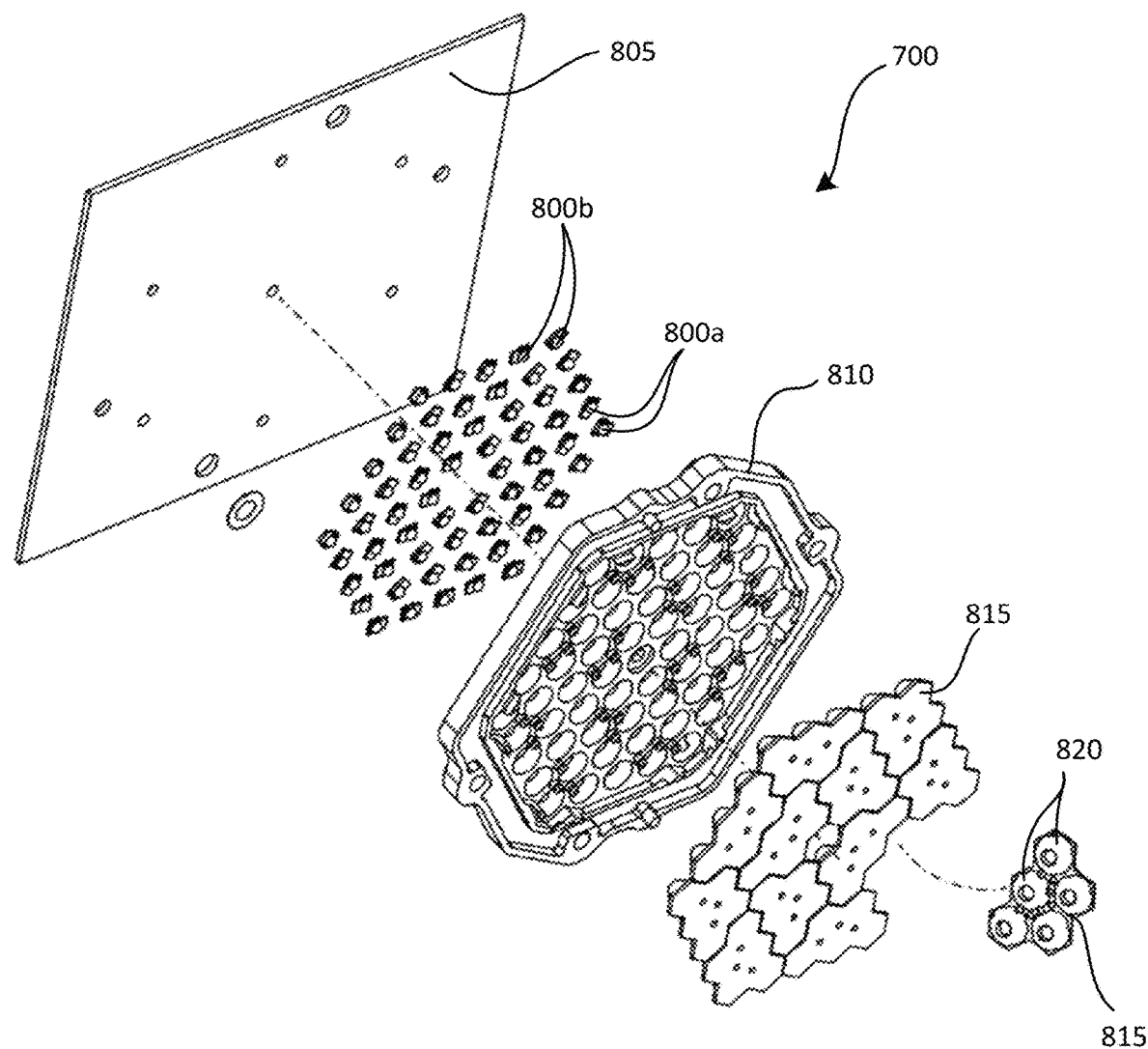
FIG. 8 illustrates an exploded view of components of the lighting fixture of FIG. 6.

With reference to FIGS. 6-8, another example embodiment of the lighting fixture 130 for use with the system 100, 100A is shown. As shown in FIG. 7, the lighting fixture 130 includes a light panel 700, a mixing assembly 705 including a reflective mixing tube 710, a gate assembly 715 including a gate housing 720 with at least one gate disposed therein, and a lens assembly 725 including a lens housing 730 with at least one lens disposed therein.

As shown in FIG. 8, the light panel 700 includes multiple light sources 800a, 800b, such as light emitting diodes (LEDs). The light sources 800a, 800b are disposed on a printed circuit board 805 and held by an optic holder 810. Collimator packs 815 including collimator lenses 820 narrow the respective beams of light projected from the light sources 800a, 800b.

While some of the lighting fixtures 130 include a visible light source 800a, such as a visible light LED, the lighting fixtures 130 further include an infrared light source 800b, such as an infrared LED. In some embodiments, the light sources 800a, 800b of the lighting fixture 130 include only one infrared light source 800b, and the remaining light sources are visible light sources 800a. In other embodiments, up to half of the light sources 800a, 800b of the lighting fixture 130 are infrared light sources 800b. In other embodiments, a majority of the light sources 800a, 800b of the lighting fixture 130 are infrared light sources 800b. In some embodiments, the light sources 800a, 800b of the lighting fixture 130 include only one visible light source 800a, and the remaining light sources are infrared light sources 800b. The light emitted from the infrared light sources 800b is shaped to produce, for instance, an irregular and non-repetitive pattern of infrared light projected on the stage 305 and any objects 315 thereon.

Figure 9A:
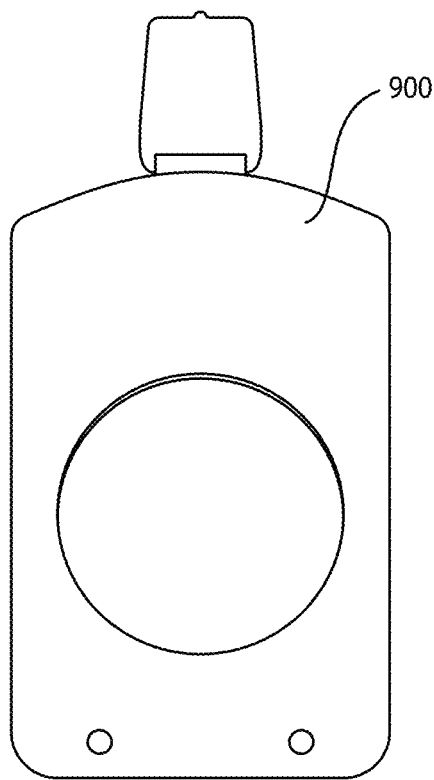
FIG. 9A illustrates a gobo holder to be used with the lighting fixture of FIG. 6.
Figure 9B:
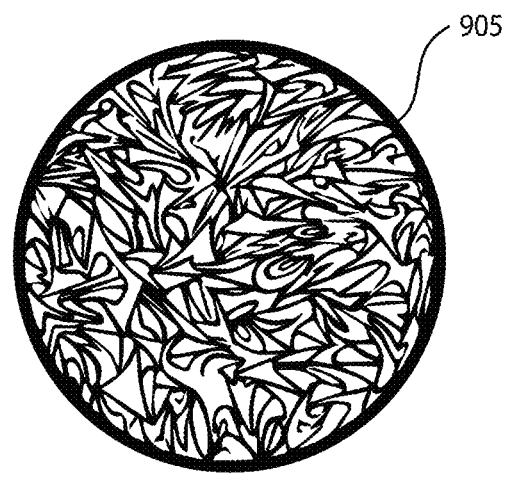
FIG. 9B illustrates a gobo to be placed in the gobo holder of FIG. 9A.
Figure 9C:
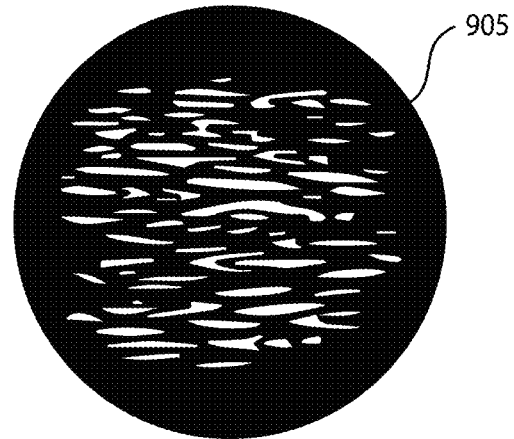
FIG. 9C illustrates an alternative gobo to be placed in the gobo holder of FIG. 9A.

Shaping the light emitted from the infrared light sources 800b may be accomplished with framing shutters (as discussed above), a gobo holder 900 (shown in FIG. 9A) with a corresponding gobo 905 (e.g., a plate or screen to project a shape or pattern such as those shown in FIGS. 9B and 9C) over the infrared light sources 800b, or the like. In embodiments utilizing framing shutters and/or gobos 905, existing equipment present at the venue 300 may be utilized instead of specialty equipment.

Figure 10:
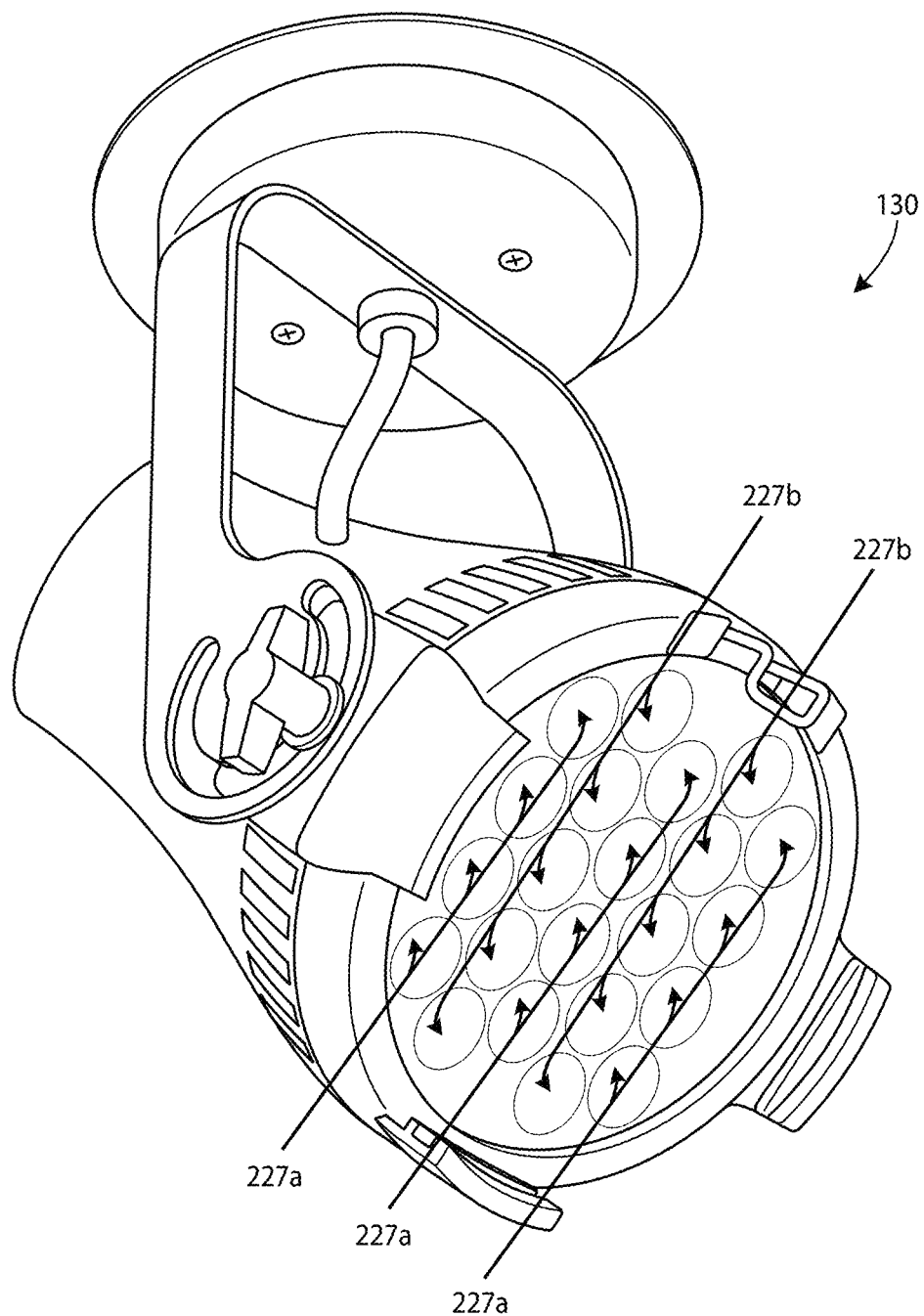
FIG. 10 illustrates an alternative lighting fixture for use in the system of FIG. 1 or the system of FIG. 1A.
Figure 11:
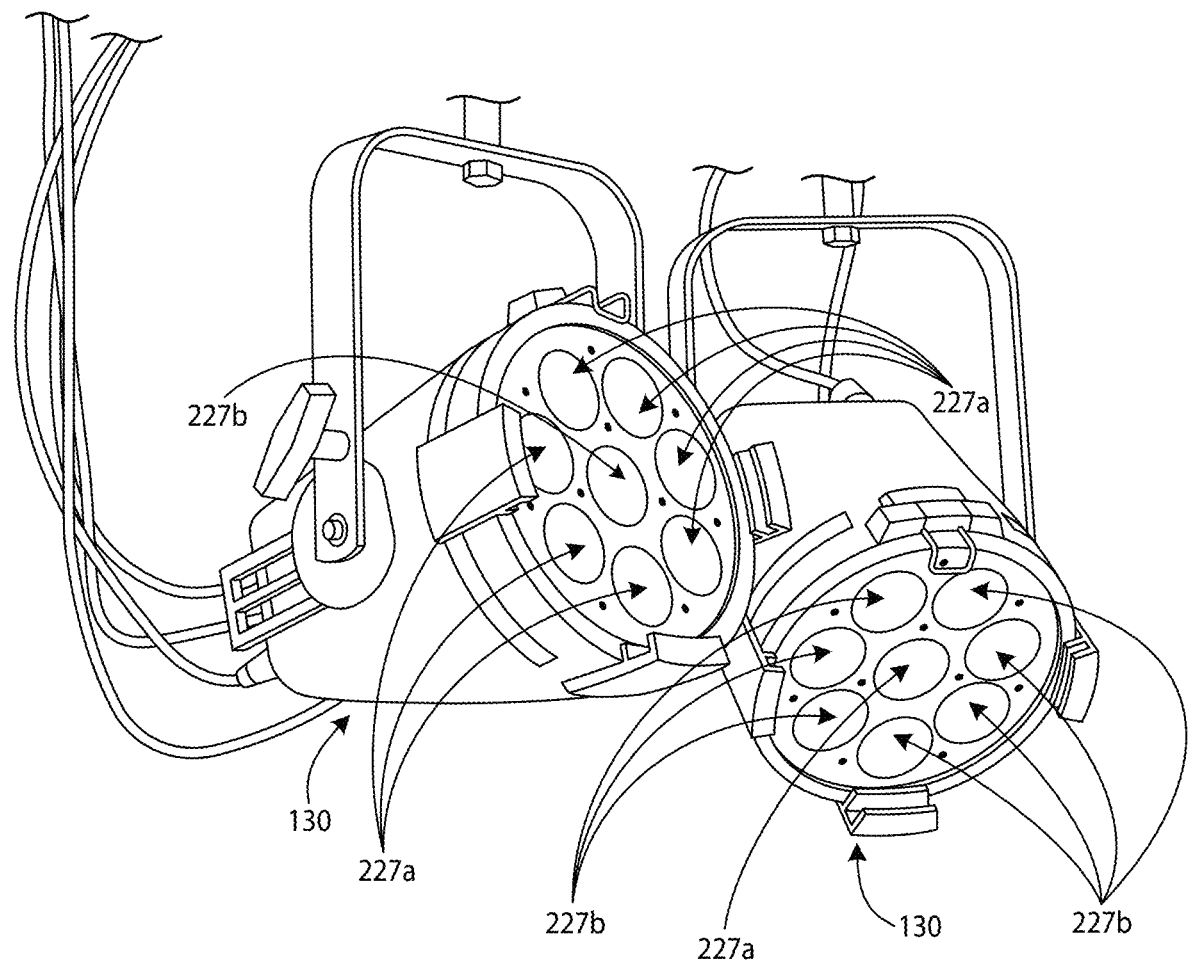
FIG. 11 illustrates alternative lighting fixtures for use in the system of FIG. 1 or the system of FIG. 1A.
Figure 12:
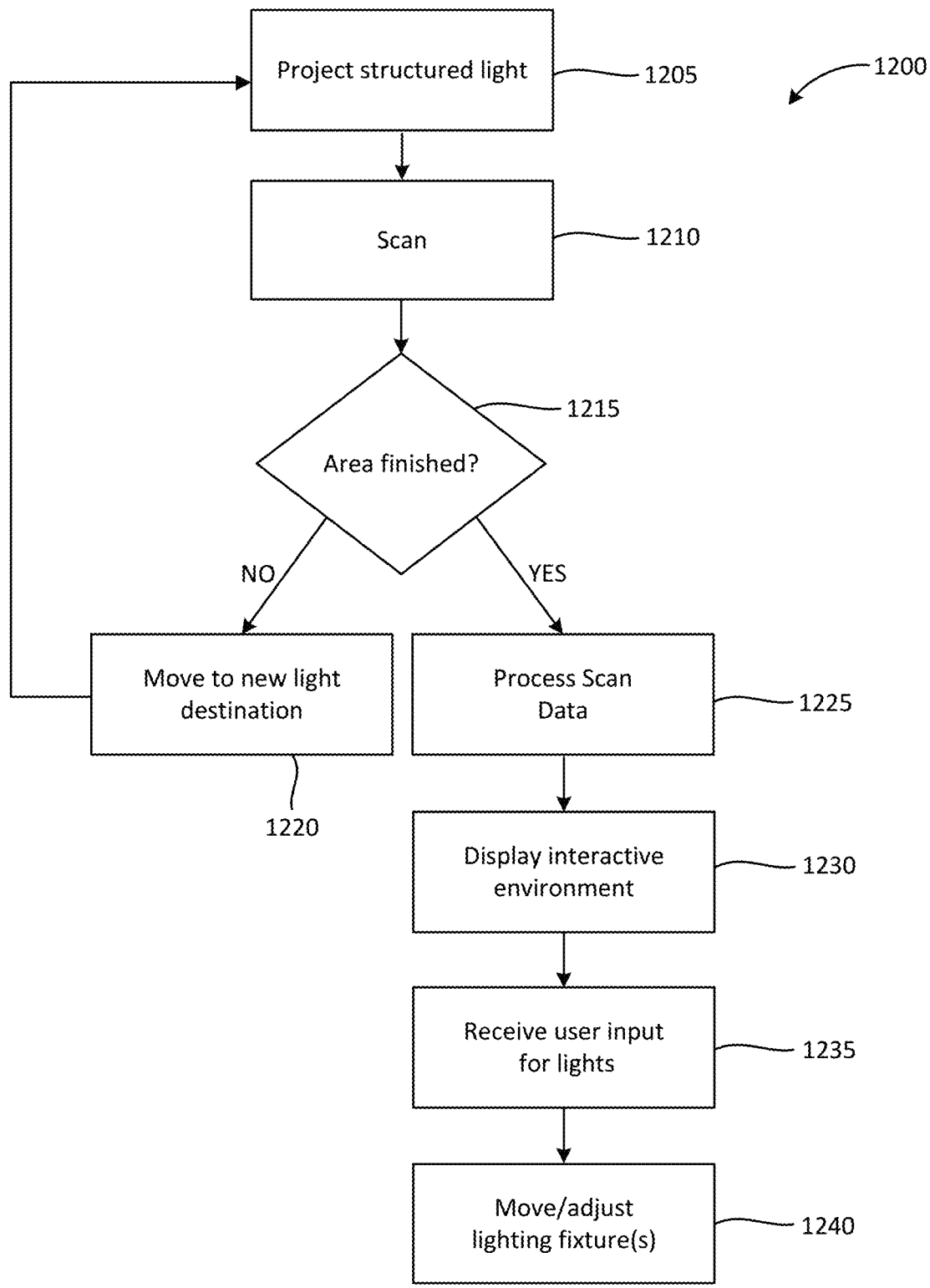
FIG. 12 illustrates a method of operating the system of FIG. 1 or the system of FIG. 1A.

With reference to FIGS. 10 and 11, other embodiments of a lighting fixture 130 are shown. In these embodiments, the visible light source(s) 800a and the infrared light source(s) 800b are disposed adjacent a projecting end of the lighting fixtures 130 instead of being positioned to project light through various assemblies such as those discussed above.

Returning to FIGS. 2 and 3, many functions are performed according to the dimension discovery application executed by, for instance, the electronic processing unit 220. The lighting fixtures 130 project either static or dynamic structured infrared light 310 onto the stage 305. The cameras 135 scan a portion of the stage illuminated by the structured infrared light 310. The controller 200 further interprets signals from the cameras 135 representing distortion of the shape and/or pattern of the structured infrared light 310 due to the contours of the stage 305 and/or objects 315 on the stage 305. The controller 200 sends signals representing dimension data from the dimension discovery application to the lighting interactive environment application. Many further functions are performed according to the lighting interactive environment application executed by, for instance, the electronic processing unit 220. The controller 200 sends signals representing display data of an interactive three-dimensional environment depicting the stage 305 and/or objects 315 on the stage 305 to one or more indicators 205. The controller 200 receives signals representing user input data via the user interface 210 regarding lighting visuals and/or lighting settings. The controller 200 then outputs one of a control signal to adjust the lighting fixtures 130 and an updated display signal to update the display shown on the one or more indicators 205 of the interactive three-dimensional environment. The updated display of the stage 305 and/or objects 315 on the stage 305 shows the change in lighting either statically or dynamically.

With control inputs through the user interface 210, the user coordinates multiple lighting fixtures 130 to produce a desired lighting effect in the interactive three-dimensional environment, which is displayed on a computer screen, the user's phone screen, an augmented reality interface, or the like. As changes are made by the user through interaction with the controls within the interactive three-dimensional environment, virtual light beams within the interactive three-dimensional environment change to reflect these interactions, thereby altering the way the virtual light beams interact with the three-dimensional rendering of the stage 305 and/or objects 315 on the stage 305. Once the user input controls are finalized in the interactive three-dimensional environment, the altered appearance of the three-dimensional rendering of the stage 305 and/or objects 315 on the stage 305 can be saved or archived as a file. This file can be revisited and further altered and/or shared amongst the lighting designers, lighting console operators, lighting/system technicians, or the like.

Additionally or alternatively, with control inputs through the user interface 210, the user coordinates the multiple lighting fixtures 130 to produce a desired lighting effect on the actual stage 305 and/or objects 315 on the stage 305 by indicating illumination locations in the interactive three-dimensional environment. These directions can cause the designated lighting fixtures 130 (selected as a subset or all of the available lighting fixtures 130) to move such that the light projected therefrom strikes the stage 305 and/or objects 315 on the stage 305 in the real world at the location corresponding to the location the user designated in the interactive three-dimensional environment. In some embodiments, the user may further select a follow-spot mode with control inputs through the user interface 210. In such a mode, the lighting fixtures 130 automatically illuminate a particular selected object 315 regardless of its location on the stage 305. In some embodiments, the lighting fixture(s) 130 acting as the follow-spot automatically shut off if the selected object 315 leaves the stage 305.

FIG. 7 illustrates a method 1200 of mapping the stage 305 in three dimensions to create an interactive three-dimensional environment and to control the lighting fixtures 130 associated with the stage 305. The method 1200 includes illuminating a portion of the stage 305 and/or objects 315 on the stage 305 with structured infrared light 310 projected by the lighting fixtures 130 (step 1205). This step includes projecting, for instance, a plane of light against the stage 305 and/or objects 315 on the stage 305 which displays a line on the stage 305 and/or objects 315 on the stage 305. This plane of light is formed by a designated positioning of framing shutters 505 inside a moving head of the lighting fixture 130 or by a line pattern gobo 905 (e.g., a plate or screen placed in front of a lighting fixture 130 to project a shape or pattern) coupled to the lighting fixture 130. This line is then reflected, in an example instance, as a curvilinear-shaped set of points describing a contour line of the stage 305 and/or objects 315 on the stage 305. Other embodiments include projecting, for instance, a pattern or grid of infrared light against the stage 305 and/or objects 315 on the stage 305. Objects 315 that may be present on the stage 305 include, for example, scenery elements. The structured infrared light 310, as it appears on the stage 305 and/or objects 315 on the stage 305, is then captured by scanning equipment including, for instance, cameras 135 (step 1210).

The method 1200 further includes the controller 200 determining whether the lighting fixtures 130 have directed the structured infrared light 310 to all the required locations to map the entire desired area, such as the entire stage 305 and/or all the objects 315 on the stage 305 (step 1215). The controller 200 determines whether the lighting fixtures 130 have followed an entire dimension discovery control string for the movement about a designated area. As an example, the lighting fixtures 130 are controlled to move each lighting fixture 130 a designated percentage of the overall pan angle capability and/or a designated percentage of the overall tilt angle capability of the lighting fixture 130 to a series of intermediate positions. The user designates the outer bounds for these angles, or the outer bounds may simply be the limits on the physical capabilities of each lighting fixture 130. Additionally or alternatively, the cameras 135 provide feedback regarding if and when the structured infrared light 310 appears in the same scan image as the reference points 320. The reference points 320 could designate an outer perimeter of the scan area. In some embodiments of the method 1200, the user inputs via the user interface 210, for instance, that the lighting fixture 130 has moved as far as is necessary for the desired area. This user input can be with regard to a single direction of the movement of the lighting fixtures 130 or it can be with regard to the overall movement of the lighting fixtures 130.

If the result at step 1215 is no, the method 1200 proceeds with moving the lighting fixtures 130 (or switching from a first lighting fixture 130 to a second lighting fixture 130) in order to move the structured infrared light 310 to a different portion of the area to be mapped (step 1220). In embodiments including moving lighting fixtures 130, the movement is enacted by a dimension discovery control string (executed by, for instance, the electronic processing unit 220) automatically directing motors of each respective lighting fixture 130, by a user manually manipulating the lighting fixture 130 directly, or by a user manually inputting controls in the user interface 210 for the motors of each respective lighting fixture 130. In embodiments including switching which lighting fixture 130 projects the structured infrared light 310 in order to move the structured infrared light 310, the switching on or off of respective lighting fixtures 130 is enacted by a dimension discovery control string (executed by, for instance, the electronic processing unit 220) automatically activating and deactivating the lighting fixtures 130, by a user manually connecting and disconnecting the lighting fixtures 130 from a power source, or by a user manually inputting controls in the user interface 210 for switching on or off respective lighting fixtures 130. Once the lighting fixtures 130 projecting the structured infrared light 310 have moved and/or the subset of lighting fixtures 130 projecting the structured infrared light have changed, the structured infrared light 310 arrives at its new illumination portion of the stage 305 and/or objects 315 on the stage 305 at step 1205. The method 1200 then continues again through steps 1210 and 1215.

If the result at step 1215 is yes (either on the first time arriving at step 1215 in the method 1200 or after having repeated steps 1205 and 1210 one or more times), the method 1200 includes the controller 200 processing the scan data received from the cameras 135 to determine three-dimensional spatial locations for points where the structured infrared light 310 reflects from the stage 305 and/or objects 315 on the stage 305 (step 1225).

Step 1225 is completed utilizing known distances of the lighting fixtures 130 from the cameras 135, the positions of the lighting fixtures 130 and the cameras 135 relative to the stage 305 (such as relative to a reference point 320 on or around the stage 305), and the direction of the beam projecting the structured infrared light 310. With this information, the location of each point in the set of points that make up the structured infrared light 310 at a given position can be determined by trigonometric triangulation. Some embodiments utilizing these known distances are also used as part of a closed system calibration routine for adjusting the lighting fixtures 130. Further, some embodiments utilize a frequency analysis of the image captured by the camera 135 to locate a single side of the projected light with a sliding window approach to efficiently locate the edge. This approach avoids depending on uncertainty in the shape and control of components such as framing systems and gobos in projecting the structured infrared light 310.

In some embodiments, step 1225 includes the use of multiple cameras 135 located at known distances from each other. The images captured by the multiple cameras 135 are processed with a pattern recognition system which locates matching points among the different images of the same portion of the stage 305 and/or objects 315 on the stage 305. The pattern recognition system includes analysis methods such as random sample consensus (RANSAC), iterative closest point (ICP), or the like. The contours and shape of the stage 305 and/or objects 315 on the stage 305 are determined using this group of images that are connected at the matching points by the pattern recognition system. In instances including a flat and smooth surface that offers no contour or shape to recognize with the pattern recognition system using a single line of the structured infrared light 310, a pattern or grid of structured infrared light 310 is projected instead of the single line in order to allow the pattern recognition system to locate matching points among the various images captured by the multiple cameras 135. Such a pattern or grid of structured infrared light 310 includes a plurality of lines, a distinct and non-repeating series of shapes, or the like. Such a pattern or grid of structured infrared light 310 is formed by equipping the lighting fixtures 130 with a designated gobo 600. The scan data may also be run through a band-pass filter that passes signals corresponding to light that is in the infrared portion of the electromagnetic spectrum, while rejecting signals corresponding to light that is in the visible portion of the electromagnetic spectrum. In this manner, the method 1200 operates effectively regardless of the amount of visible light present on or about the stage 305.

Once the scan data has been processed (step 1225), the method 1200 further includes generating and displaying the stage 305 and/or objects 315 on the stage 305 in an interactive three-dimensional environment based on the scan data (step 1230). As described above, this interactive three-dimensional environment is displayed with, for instance, the indicators 205 (e.g., a screen of the user input device 120).

The method 1200 also includes receiving user input data from a user regarding lighting visuals and/or lighting settings for the lighting fixtures 130 via, for instance, the user interface 210 (step 1235). The user input, in some embodiments, includes an interaction by the user with features of the display of the interactive three-dimensional environment. These interactions include, for instance, directing beams of light to a destination indicated in the interactive three-dimensional environment, changing a brightness or color of a light by adjusting dials or other controls displayed in the interactive three-dimensional environment, indicating a light destination by selecting locations on the stage 305 and/or objects 315 on the stage 305 displayed within the interactive three-dimensional environment, indicating a movable object 315 on the stage 305 displayed within the interactive three-dimensional environment to be followed with one or more follow-spots, or the like.

Once the user input data has been received (step 1235), the method 1200 also includes controlling the lighting fixtures 130 to move and otherwise adjust in order to match the desired results indicated by the user through the user input (step 1240). This step is accomplished by generating and transmitting a command signal (or a command string) to the lighting fixtures 130 either directly or indirectly through a control panel 125 to control the lighting fixtures 130.

Some embodiments of the method 1200 described above further include updating the display of the stage 305 and/or objects 315 on the stage 305 within the interactive three-dimensional environment to reflect the user input received at step 1235. The user then makes further adjustments or confirms the lighting scheme that has been selected. Once the lighting scheme has been confirmed, the method 1200 then moves to step 1240 to control the lighting fixtures 130. In some embodiments, the controller 200 catalogs the user input data in the form of a lighting command string. This lighting command string includes all the lighting commands for a single static lighting visual, lighting commands for multiple lighting visuals in sequence, lighting commands for a dynamic lighting visual, or the like.

Some embodiments of the method 1200 include the controller 200 processing the scan data (as is done at step 1225) in a more segmented manner by processing the scan data acquired each instance after step 1210 has been completed. This processed scan data is augmented with further input from the cameras 135 after each additional instance of step 1210 is performed. Some embodiments include rendering the interactive three-dimensional environment a portion at a time as the processed scan data is acquired, allowing the user to view the progress of the data gathering portions of the method 1200.

Some embodiments of the method 1200 utilize a number of lighting fixtures 130 projecting the structured infrared light 310 and a number of cameras 135 to capture images of the structured infrared light 310 that is sufficient to gather adequate scan data for the entire stage 305, including any and all objects 315 on the stage 305, in a single pass or scan. Such embodiments of the method 1200 do not require step 1215 or step 1220.

Some embodiments further include labeling multiple features of the interactive three-dimensional environment according to semantic mapping techniques (e.g., a program that is trained to recognize common stage items and label these objects in the interactive 3D environment).

Figure 13:
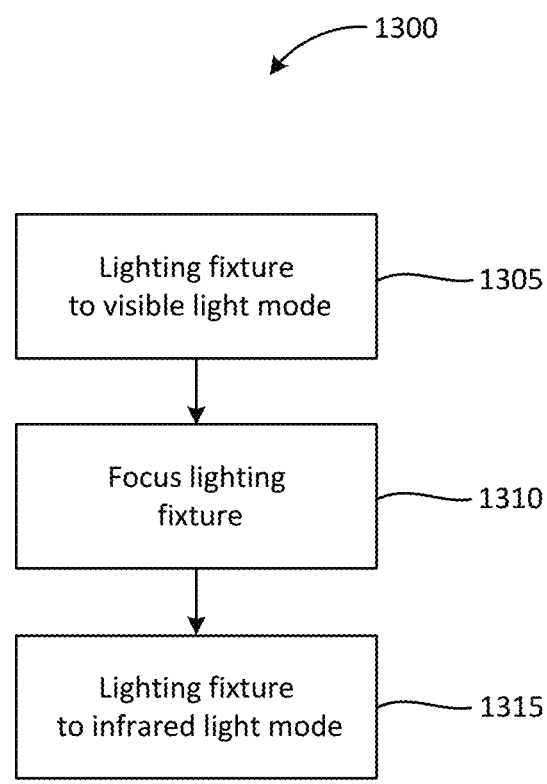
FIG. 13 illustrates another method of operating the system of FIG. 1 or the system of FIG. 1A.

FIG. 13 illustrates another exemplary method 1300 of mapping a stage 305, potentially including objects 315 on the stage 305, in three dimensions. This method 1300 may be performed in conjunction with the method 1200 described above, or it may be performed separately from the method 1200.

As illustrated in FIG. 13, the method 1300 includes operating lighting fixtures 130 in a visible light mode (step 1305). The visible light mode includes a visible light source 800a of the lighting fixture 130 being illuminated. In some embodiments, no infrared light source 800b is illuminated in the visible light mode. Other embodiments, however, include infrared light sources 800b also illuminated in the visible light mode.

The method 1300 further includes focusing the lighting fixture 130 while the lighting fixture 130 is in the visible light mode (step 1310). With visible light sources 800a illuminated, a user focuses the lighting fixture 130. In some embodiments, the user evaluates the characteristics of the light projected from the visible light source(s) 800a in order to properly focus the lighting fixture 130.

The method 1300 also includes switching the lighting fixture 130 to an infrared light mode (step 1315). The infrared light mode includes infrared light sources 800b being illuminated. The infrared light mode, in some embodiments, includes no visible light source 800a being illuminated. Since the lighting fixture 130 was focused while in the visible light mode (at step 1310), structured infrared light 310 projected from the infrared light sources 800b will be in focus.

In some embodiments, the method 1300 continues on from step 1315 to next begin step 1205 of the method 1200 described above. For example, if no visible light sources 800a of the lighting fixture(s) 130 are illuminated in the infrared light mode, the method 1200 is carried out during, for instance, a live performance on the stage 305 without disrupting the lighting that is visible to the audience.

In some embodiments, the lighting fixtures 130 used for projecting the structured infrared light 310 in the method 1200 are used only for projecting the structured infrared light 310, while other lighting fixtures 130 having no infrared light sources 800b perform the normal lighting functions during a performance on the stage 305. In such embodiments, the inclusion of the visible light sources 800a in the lighting fixtures 130 used for projecting the structured infrared light 310 is for focusing the lighting fixtures 130.

In other embodiments, the lighting fixtures 130 used for projecting the structured infrared light 310 in the method 1200 also utilize the visible light sources 800a found in each respective lighting fixture 130 for lighting the stage 305 during a performance. In such embodiments, the method 1200 is performed only once, or the method 1200 is performed more than once.

In embodiments including the method 1200 occurring only once, the lighting fixtures 130 including the infrared light sources 800b shut off the infrared light sources 800b after the method 1200 has been completed and continue on with only the visible light sources 800a illuminated when necessary during the performance. Alternatively, the infrared light sources 800b may be left on, even when no camera 135 is being activated to detect the structured infrared light 310.

In embodiments including the method 1200 occurring periodically (even during a performance), the visible light sources 800a are illuminated when necessary during the performance until the method 1200 is required. During the method 1200, the visible light sources 800a are off such that the motion and/or positioning of the lighting fixture 130 having the infrared light sources 800b can move freely for the method 1200 without disrupting the aesthetic of the performance.

In embodiments including the method 1200 occurring frequently or continuously, the visible light sources 800a are illuminated when necessary during the performance while the infrared light sources 800b are selectively illuminated when the positioning of the respective lighting fixtures 130 is appropriate for the method 1200 to benefit from structured infrared light 310 being projected from the particular lighting fixtures 130. The lighting fixtures 130 including infrared light sources 800b move according to any upcoming visual light cues in the performance, and the system 100, 100A must use whatever lighting fixtures 130 are pointing in a position that is helpful to the method 1200. Since the system 100, 100A is able to remove visible light from the scan data with a band-pass filter, even the lighting fixture 130 projecting the structured infrared light 310 may also project visible light for the performance. If a particular lighting fixture 130 that includes infrared light sources 800b is not needed for an upcoming visual cue for a sufficient amount of time, that lighting fixture 130 may move freely for the method 1200 until it is needed for the next visual light cue. While moving freely, only the infrared light sources 800b of the particular lighting fixture 130 would be illuminated so as to not disrupt the aesthetic of the performance. In such embodiments, the system 100, 100A would likely include more lighting fixtures 130 equipped with infrared light sources 800b when compared to other embodiments of the system 100, 100A described herein.

Thus, embodiments described herein provide, among other things, systems and methods of mapping a stage in three dimensions and object detection to create an interactive three-dimensional environment and to control one or more lights associated with the stage. Various features and advantages of some embodiments are set forth in the following claims.

What is claimed is:

1. A system for mapping a stage, the system comprising:
a lighting fixture including a visible light source and an infrared light source, the lighting fixture configured to at least partially illuminate the stage with structured infrared light in an infrared light mode;
a scanner configured to detect the structured infrared light on the stage; and a controller connected to the lighting fixture and the scanner, the controller configured to:
  turn on the visible light source in a visible light mode to allow a user to focus the lighting fixture,
  turn off the visible light source and turn on the infrared light source in the infrared light mode to illuminate at least a portion of the stage with the structured infrared light, the visible light source being continuously off during a majority of the infrared light mode,
  control the scanner to scan the structured infrared light on the portion of the stage,
  receive a signal from the scanner as scan data corresponding to the structured infrared light on the portion of the stage that was scanned, and
  translate the scan data into three-dimensional location data.

2. The system of claim 1, wherein the controller is further configured to generate a display of the three-dimensional location data as an interactive three-dimensional environment.

3. The system of claim 2, wherein the controller is further configured to:
  receive a user input, and
  adjust a lighting setting of the visible light source of the lighting fixture based on the user input.

4. The system of claim 1, wherein the controller is further configured to adjust a focus of the lighting fixture with the lighting fixture in the visible light mode.

5. The system of claim 1, wherein the scanner includes an infrared band-pass filter.

6. The system of claim 1, wherein the controller is further configured to translate portions of the scan data corresponding only to infrared light scanned by the scanner and omit portions of the scan data corresponding to visible light scanned by the scanner.

7. A method of mapping a stage, the method comprising:
operating a lighting fixture in a visible light mode;
allowing a user to focus the lighting fixture while the lighting fixture is in the visible light mode;
switching the lighting fixture from the visible light mode to an infrared light mode by turning off a visible light source and turning on an infrared light source;
illuminating at least a portion of the stage with structured infrared light from the lighting fixture in the infrared light mode;
scanning the structured infrared light on the stage, thereby producing scan data;
translating the scan data into three-dimensional location data; and
displaying the three-dimensional location data as an interactive three-dimensional environment.

8. The method of claim 7, further comprising switching the lighting fixture back into the visible light mode to illuminate at least the portion of the stage with visible light.

9. The method of claim 8, further comprising:
  interacting with the interactive three-dimensional environment, and
  changing a lighting setting of the lighting fixture in the visible light mode based on the interaction with the interactive three-dimensional environment.

10. The method of claim 7, wherein the infrared light mode includes no visible light projecting from the lighting fixture.

11. The method of claim 7, wherein the visible light mode includes no infrared light projecting from the lighting fixture.

12. The method of claim 7, wherein the three-dimensional location data is based only on the scanned structured infrared light.

* * * * *